Patented Jan. 19, 1954

2,666,759

UNITED STATES PATENT OFFICE 2,666,759

MANUFACTURE OF ACIDS AND SALTS FROM GUMS

William H. Wood, University Heights, Ohio, assignor to Harris-Seybold Company, Cleveland, Ohio, a corporation of Delaware No Drawing. Application June 19, 1948,
Serial No. 34,153

4 Claims. (Cl. 260—209)

Natural gums, while having some properties adapting them to certain uses, have other properties which greatly limit their scope of possible utilities. It has long been recognized as desirable that these limitations be overcome, but the complexity of such raw material and its vulnerability to detrimental breakdown in gross chemical procedures have obstructed progress in this direction. It has been known, for instance, that gum arabic dissolved in water could be treated with anhydrous alcohol hydrochloric acid and then could be added to form a precipitate, and this precipitate could be separated and washed with alcohol to yield a product of arabic acid. The necessary repeated re-dissolving and re-precipitating required by such process, is a tedious and expensive manufacturing schedule. Such products as thus heretofore attainable have had a pH of about 3.3, and they have poor keeping qualities in solution, being susceptible to bacterial and mold attack. In accordance with the present invention, however, it now becomes possible to attain acid products from gum arabic and other water-soluble gums, which have a pH materially lower in numerical value and which are in effect truly acids as contrasted with the mixed products heretofore commercially known; and the present products resist decomposition. The acids may be further converted into metal salts having new and useful properties. Other objects and advantages of the invention will appear from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

As raw materials, water-soluble naturally occurring gums, or water-soluble constituents of naturally occurring gums, which are salts of strong organic acids are applicable. Such are, for instance, gum arabic, mesquite gum, ghatti gum, tahla gum, brea gum, etc. The soluble portions of partially soluble gums are illustrated, for instance, by such portion of gum tragacanth, gum karaya, etc. Whether the gum be in true solution or in dispersion sufficient for the processing is equivalent. The concentration of the gum in such solution may be guided somewhat by its degree of solubility, and by the desired concentration of the ultimate solution to be produced (if the product is to be used directly in solution form), and by considerations of viscosity limitation as apt to affect throughput, etc. For instance, a convenient concentration for an operation with gum arabic is around 22 per cent. But, as noted, the concentration may vary quite widely, and as an illustrative range may be 5 to 30 per cent. The raw gum solution is desirably filtered to remove fragments of wood and undissolved material including insoluble portions, and dirt. Then the solution is subjected to the action of a cation-exchange complex. Such agent includes complex silica compounds on the order of acid-treated zeolites, certain carbonaceous materials such as lignite, peat, coal, etc., treated with fuming sulphuric acid, and complex carbon compounds on the order of synthetic resins, such as phenol-formaldehyde-sulphonic acid resins, (commercial instances of which are sold under the trade names "Ionac," "Dowex," "Amberlite," etc.). These cation-exchange complexes in general are high molecular combinations based on the fourth group elements carbon or silicon in which the very large molecules have loosely bound hydrogen. Analyses indicate that the products of the present process are hydrogen-containing, to the exclusion of metallic elements. In this, the present product distinguishes from commercial products such as arabic acid so-called, heretofore known. That is, it now becomes possible to attain a real acid as product.

Suitable contacting of the gum with the cation-exchange complex can be accomplished in such manner as convenient, but desirably the cation-exchange agent may, in the granular form, be applied as a bed through which the gum solution may be passed, by gravity or pumping. And, for instance, a column, such as of large pipe diameter, with suitable retaining grid at the bottom and several feet of granular filling of a cation-exchange resin such as aforenoted, can afford a relatively large capacity. Thus, for instance, with a 20 per cent gum arabic solution run through such an exchange column, a product solution may be attained which is pure arabic acid. The pH is about 2.0, for instance, increasing progressively as the bed becomes exhausted.

When the exchange agent loses its efficiency, it may be washed with water in reverse flow and thereafter be regenerated by washing with, for instance, 4 per cent hydrochloric acid, or with a sodium chloride solution and then with dilute sulphuric acid, and finally a washing with pure water.

Such arabic acid, or other gum acid, as the case may be, depending upon the particular raw material, may be used as such in the solution form as obtained, or it may be converted to dry form by drying. And, it is to be noticed that such a dried product may be re-dissolved without difficulty, in contrast to dry preparations of gum acids commonly heretofore available, this difference perhaps being due to absence of retrograde change occurring in the old treatment with mineral acid. This product furthermore is remarkable for its keeping properties. This is wholly unexpected and surprising, as the acid-precipitated products heretofore known, and even laboratory dialyzed products, have poor keeping qualities, being susceptible to rapid bacterial and mold attack. It is well known that even with addition of the most efficient antiseptics obtainable, the keeping of commercial products heretofore known has been unsatisfactory. The reason for this difference in the present product is not known, but apparently impurities which would support bacterial and mold growth are removed sufficiently in even one pass in the present treatment to yield products commercially satisfactory without addition of antiseptics.

Such acid product as obtained foregoing may be next converted into metallic salts of novel and useful properties, and thus by reacting the arabic acid or other gum acid solution with a suitable metallic agent, such as freshly-precipitated iron carbonates, the iron salt of the arabic acid or other gum acid is attained, and such salt is found to have properties suiting it for preparation of light-sensitive papers, pigments, and as a medicinal preparation for administration of iron, etc. By similarly reacting with a suitable copper compound, such as carbonate, the copper salt of arabic acid or other gum acid is obtained, and this salt is found to have properties fitting it for fungicidal usage as in horticultural spraying, and as an addition agent in electroplating, etc. And likewise by reacting with silver carbonate, the silver salt of the arabic acid or other gum acid is obtained, and this salt is found to have antiseptic properties which render it suitable for use in ophthalmic infections and the like in place of silver nitrate and organic compounds of silver. Also such silver compounds are suitable for light-sensitive usages. Similarly, other metallic neutralizers or precipitants may be employed, to the attainment of the corresponding metal salt of the gum acid, and chromium salts and various others thus are available.

Other modes of applying the principle of the invention may be employed, change being made as regards the detail described, provided the features stated in any of the following claims, or the equivalent of such, be employed.

I therefore particularly point out and distinctly claim as my invention:

1. A process of making products from gums, comprising dissolving a naturally occurring exudate gum in water, separating any foreign particles, and reacting the dissolved gum with a cation exchange complex selected from the group consisting of sulphuric acid-treated carbonaceous materials, acid-treated zeolites and phenol-formaldehyde-sulphonic acid resins so as to decompose the gum and split the acid organic molecular portion from the combined bases and prevent degradation breakdown of the organic portion and eliminate materials which support bacterial and mold growth to form a decomposition-resisting product.

2. A process of making a product from gum arabic, comprising dissolving gum arabic in water, separating any foreign particles, and reacting the dissolved gum arabic with a cation exchange complex selected from the group consisting of sulphuric acid-treated carbonaceous materials, acid-treated zeolites and phenol-formaldehyde-sulphonic acid resins so as to decompose the gum and split the acid organic molecular portion from the combined bases and prevent degradation breakdown of the organic portion and eliminate materials which support bacterial and mold growth to form a decomposition-resisting product.

3. A process of making products from gums, comprising dissolving a naturally occurring exudate gum in water, separating any foreign particles, and reacting the dissolved gum with a cation exchange complex selected from the group consisting of sulphuric acid-treated carbonaceous materials, acid-treated zeolites and phenol-formaldehyde-sulphonic acid resins so as to decompose the gum and split the acid organic molecular portion from the combined bases and prevent degradation breakdown of the organic portion and eliminate materials which support bacterial and mold growth to form a decomposition-resisting product, and finally neutralizing the so-formed acid organic molecular portion with a carbonate of carbonate-forming metal of molecular weight 56–108 selected from the group consisting of iron, copper and silver.

4. A process of making a product from gum arabic, comprising dissolving gum arabic in water, separating any foreign particles, and reacting the dissolved gum arabic with a cation exchange complex selected from the group consisting of sulphuric acid-treated carbonaceous materials, acid-treated zeolites and phenol-formaldehyde-sulphonic acid resins so as to decompose the gum and split the acid organic molecular portion from the combined bases and prevent degradation breakdown of the organic portion and eliminate materials which support bacterial and mold growth to form a decomposition-resisting product, and finally neutralizing the so-formed acid organic molecular portion with a carbonate of carbonate-forming metal of molecular weight 56–108 selected from the group consisting of iron, copper and silver.

WILLIAM H. WOOD.

References Cited in the file of this patent

UNITED STATES PATENTS

| Number | Name | Date |
|---|---|---|
| 637,090 | Cunningham et al. | Nov. 14, 1899 |
| 2,323,483 | Myers et al. | July 6, 1943 |

OTHER REFERENCES

Chem. Abstracts, vol. 23, pp. 3388 to 3389, 5382 (1929).

Walder: Food, v. 18 (January 1949), page 5, 1 page.

Krantz et al.: J. Am. Pharm. Assoc., v. 18 (1929), pp. 463–4, 2 pp.

Briggs: J. Phys. Chem., v. 38 (1934), pp. 867–869, 3 pp.

Ryznar: Ind. Eng. Chem., v. 36 (1944), pp. 821–823, 3 pp.

Mantell: Water-Soluble Gums, pp. 35 to 44 (1947), published by Reinhold Publishing Corp., N. Y. C.

Ion Exchange, Chemical Engineering, July 1947, pp. 123 to 130.